(12) United States Patent
Kazda et al.

(10) Patent No.: US 10,831,965 B1
(45) Date of Patent: Nov. 10, 2020

(54) PLACEMENT OF VECTORIZED LATCHES IN HIERARCHICAL INTEGRATED CIRCUIT DEVELOPMENT

(71) Applicant: International Business Machines Corporation, Armonk, NY (US)

(72) Inventors: Michael Kazda, Poughkeepsie, NY (US); Harald Folberth, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/519,440

(22) Filed: Jul. 23, 2019

(51) Int. Cl.
*G06F 17/50* (2006.01)
*G06F 30/392* (2020.01)
*G06F 30/18* (2020.01)

(52) U.S. Cl.
CPC .......... *G06F 30/392* (2020.01); *G06F 30/18* (2020.01)

(58) Field of Classification Search
USPC .............. 716/110, 111, 113, 118, 119, 126
See application file for complete search history.

(56) References Cited

U.S. PATENT DOCUMENTS

| | | | | |
|---|---|---|---|---|
| 6,421,818 B1 * | 7/2002 | Dupenloup | ............. | G06F 30/30 716/105 |
| 6,567,957 B1 * | 5/2003 | Chang | ..................... | G06F 30/30 716/102 |
| 6,606,730 B1 | 8/2003 | Yoshimaru et al. | | |
| 6,609,228 B1 | 8/2003 | Bergeron et al. | | |
| 6,836,877 B1 * | 12/2004 | Dupenloup | ............. | G06F 30/30 716/103 |
| 7,624,364 B2 | 11/2009 | Albrecht et al. | | |
| 8,489,825 B2 | 7/2013 | Van Berkel | | |
| 2007/0245281 A1 | 10/2007 | Riepe et al. | | |
| 2018/0046072 A1 | 2/2018 | Lutich | | |

FOREIGN PATENT DOCUMENTS

| | | |
|---|---|---|
| GB | 1500527 A | 2/1978 |
| JP | 5004971 B2 | 6/2012 |

OTHER PUBLICATIONS

Cho et al., "LatchPlanner: Latch Placement Algorithm for Datapath-oriented High-Performance VLSI Designs", 2013 IEEE/ACM International Conference on Computer-Aided Design (ICCAD), pp. 342-348.

\* cited by examiner

*Primary Examiner* — Brian Ngo
(74) *Attorney, Agent, or Firm* — Cantor Colburn LLP; Erik Johnson (57) ABSTRACT

Systems and methods to place latches during hierarchical integrated circuit development obtain an initial floor plan indicating a blocked region, two or more regions, and initial locations of components including the latches. A method includes identifying a subset of the latches that belong to a vector as a vector of latches, the subset of the latches being single-bit latches that must be placed in a same one of the two or more regions, and identifying a center of gravity (COG) of the vector of latches, the COG being a mean of geometric points corresponding with the subset of the latches. All of the subset of the latches are placed at the COG to generate an intermediate floor plan based on determining that the COG is not in the blocked region. A final design of the integrated circuit that is obtained based on the intermediate floor plan is provided for fabrication.

14 Claims, 6 Drawing Sheets

PLACEMENT OF VECTORIZED LATCHES IN HIERARCHICAL INTEGRATED CIRCUIT DEVELOPMENT

BACKGROUND

The present invention relates to a placement phase of integrated circuit development, and more specifically, to the placement of vectorized latches in hierarchical integrated circuit development.

Integrated circuits (i.e., chips) are designed and fabricated using a number of processes. The processes associated with designing the chip include obtaining a register transfer level (RTL) description and performing physical design to identify and place components such as gate logic. The physical design processes generally begin with logic synthesis, which maps the RTL description to a gate-level netlist (i.e., list of logical interconnects), and end with tapeout and mask generation, which refers to turning the design data into photomasks that are used in the manufacturing process. Through different stages of development, timing analysis, as well as power and noise analysis can be performed to ensure that the fabricated integrated circuit meets all the requirements. The iterative analysis and redesign based on the analysis can be performed in a hierarchical manner. That is, the development of large integrated circuits, referred to as very large scale integration (VLSI), typically entails splitting the complete design into logical and physical partitions that can be optimized in parallel and independent of each other. An exemplary hierarchical partitioning subdivides the chip into units that are each further divided into blocks and, at the next level, macros.

SUMMARY

Embodiments of the present invention are directed to systems and methods to place latches during hierarchical integrated circuit development. A method includes obtaining an initial floor plan indicating a blocked region, two or more regions, and initial locations of components of the integrated circuit including the latches within one of the two or more regions. The integrated circuit is organized into hierarchical levels such that each of the two or more regions is at one of the hierarchical levels. The method also includes identifying a subset of the latches that belong to a vector as a vector of latches. The subset of the latches in the vector of latches are single-bit latches that must be placed in a same one of the two or more regions. A center of gravity (COG) of the vector of latches is determined. The COG is a mean of geometric points corresponding with the subset of the latches that belong to the vector. All of the subset of the latches that belong to the vector are placed at the COG of the vector of latches to generate an intermediate floor plan based on determining that the COG of the vector of latches is located in one of the two or more regions rather than in the blocked region. A final design of the integrated circuit that is obtained based on the intermediate floor plan is provided for fabrication.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, placement and optimization in VLSI are generally performed in a hierarchical manner. But, vectorized latches, which are a set of single-bit latches, must stay in the same logical hierarchy. In prior integrated circuits, latch banks were used rather than vectorized latches. Latches in a latch bank are manually placed and manually replaced if timing issues arise. Latches in a latch bank can be split into smaller groups for manual placement to improve timing.

Embodiments of the invention relate to the placement of vectorized latches in hierarchical integrated circuit development. Specifically, each set of vectorized latches is identified in a flat design (i.e., the highest hierarchical level) as a subset of all the latches that are part of the same vector. After an initial placement of all the components, the flat design is partitioned. While one level of partition is discussed herein for explanatory purposes, one or more embodiments of the invention are equally applicable when additional hierarchical levels are created. With a goal of minimal movement, the latches within a vector are moved to ensure that they occupy the same partition at the lowest hierarchical level that was created.

Figure 1:
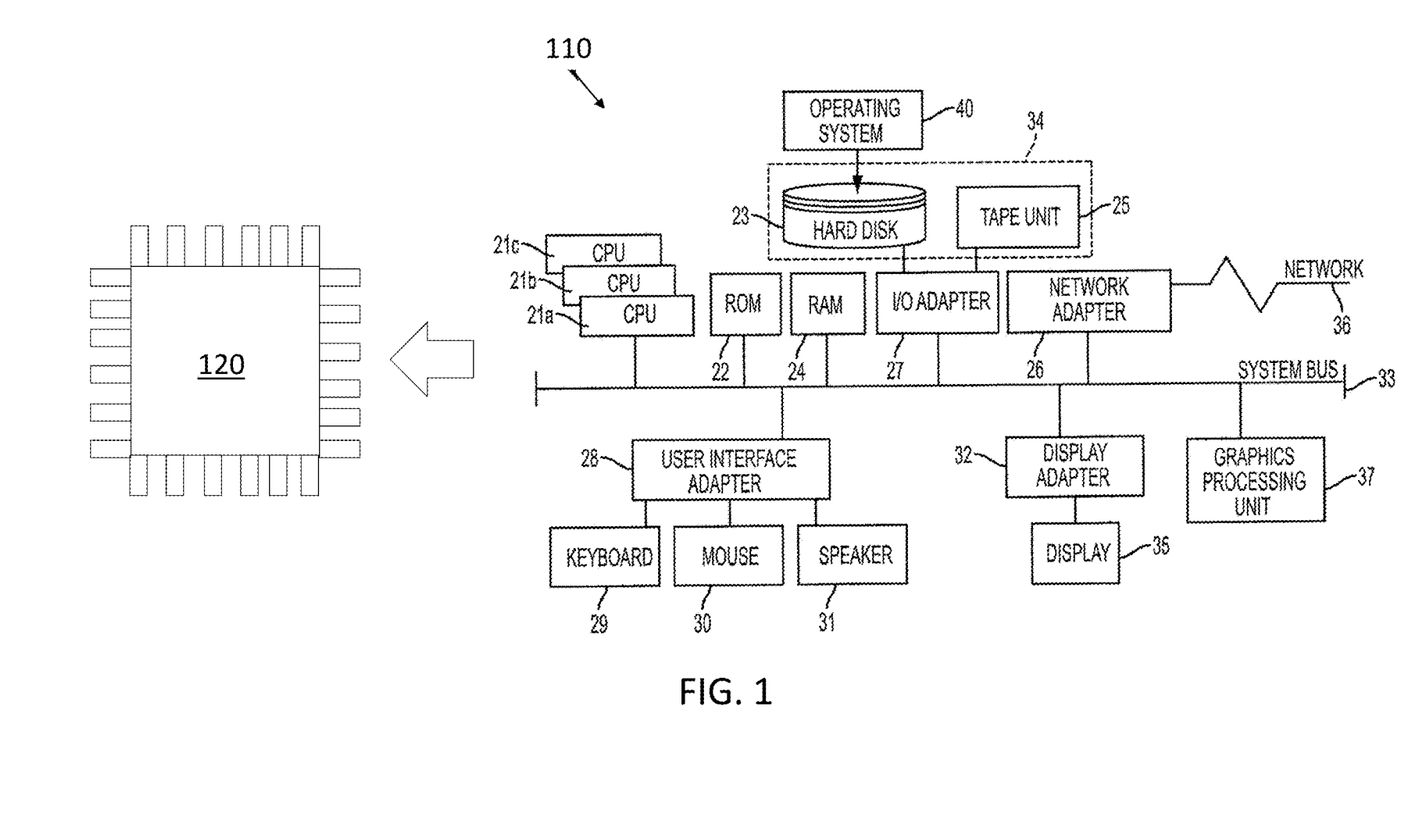
FIG. 1 is a block diagram of a system to perform the placement of vectorized latches in hierarchical integrated circuit development according to embodiments of the invention.

FIG. 1 is a block diagram of a system 100 to perform the placement of vectorized latches 220 (FIG. 2) in hierarchical integrated circuit development according to embodiments of the invention. The system 100 includes a processing system 110 used to generate the design that is ultimately fabricated into an integrated circuit 120. The steps involved in the fabrication of the integrated circuit 120 are well-known and briefly described herein. Once the physical layout is finalized, based, in part, on placing vectorized latches 220 according to embodiments of the invention, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 6.

The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 110.

Figure 2:
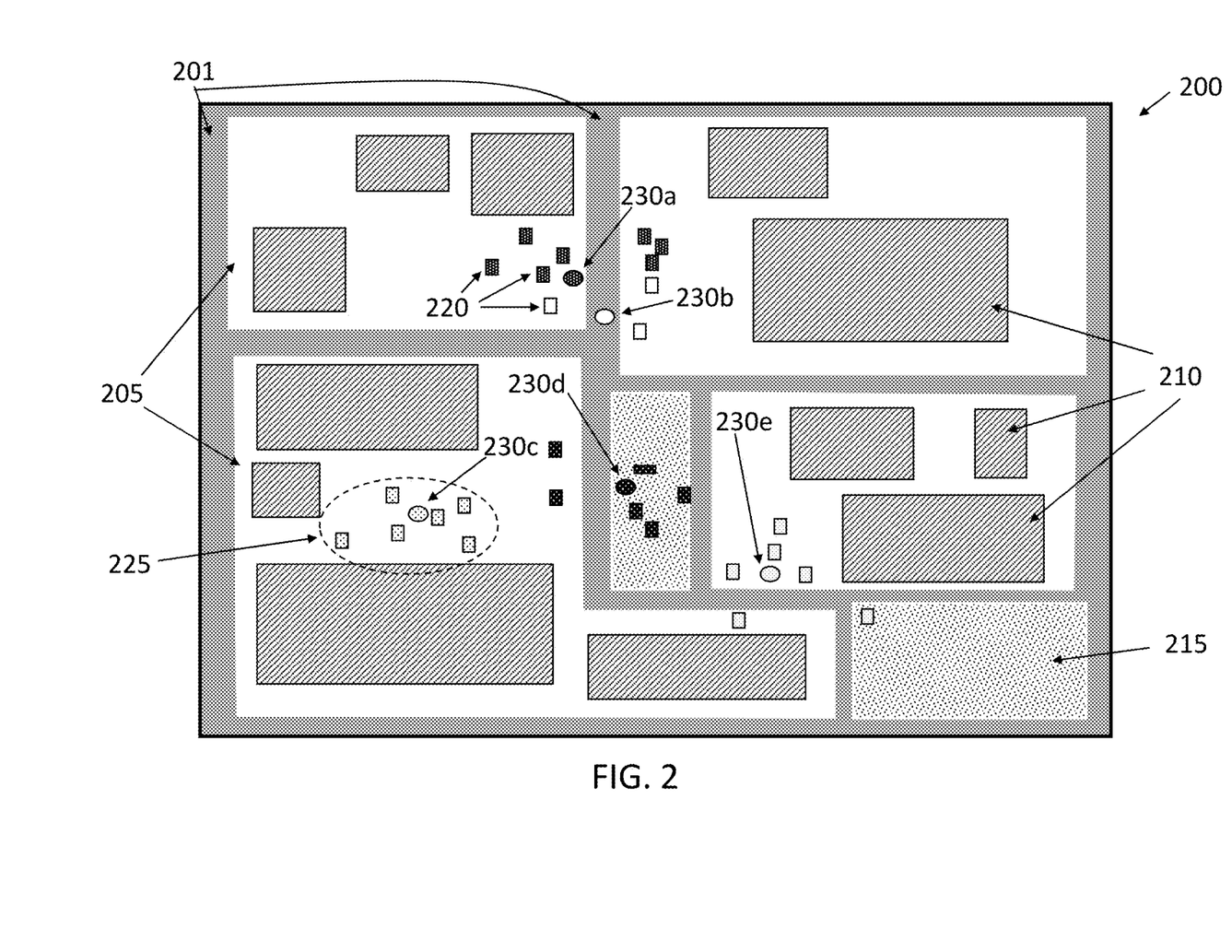
FIG. 2 is a block diagram of an exemplary initial floorplan used to perform placement of vectorized latches in hierarchical integrated circuit development according to one or more embodiments of the invention.

FIG. 2 is a block diagram of an exemplary initial floorplan 200 used to perform placement of vectorized latches 220 in hierarchical integrated circuit development according to one or more embodiments of the invention. The initial floorplan 200 is shown with top-level areas 215 that are not partitioned into a lower hierarchical level. The initial floorplan 200 is also shown with partitioned areas 205 with components 210 that are optimized as part of the respective partitioned area 205. A blocked area 201 is indicated at the outer edge of the initial floorplan 200 and between partitioned areas 205. Neither components 210 nor latches 220 may be placed in the blocked area 201. Latches 220 are shown as rectangular shapes. As previously noted, a vector 225 of latches 220 refers to a set of latches 220 that should be grouped in the same partitioned area 205 for subsequent analysis and optimization. Five exemplary vectors 225 of latches 220 are shown in FIG. 2. Each vector 225 of latches 220 is shown with its center of gravity (COG) 230a, 230b, 230c, 230d, 230e (generally referred to as 230). The COG 230 of a vector 225 of latches 220 refers to the mean of the geometric points corresponding to the latches 220 (i.e., latch locations within the geometry of the integrated circuit 120). One exemplary vector 225 of latches 220, along with the corresponding COG 230c, is indicated in FIG. 2. The COG 230b is in the blocked area 201, as further discussed with reference to FIG. 3. The different vectors 225 of latches 220 can be distinguished in FIG. 2 based on the pattern and color coding. As discussed with reference to FIG. 3 and in accordance with one or more embodiments of the invention, the latches 220 shown in the initial floor plan 200 are moved as little as possible to ensure that all the latches 220 of the same vector 225 are placed in the same partitioned area 205 or top-level area 215.

Figure 3:
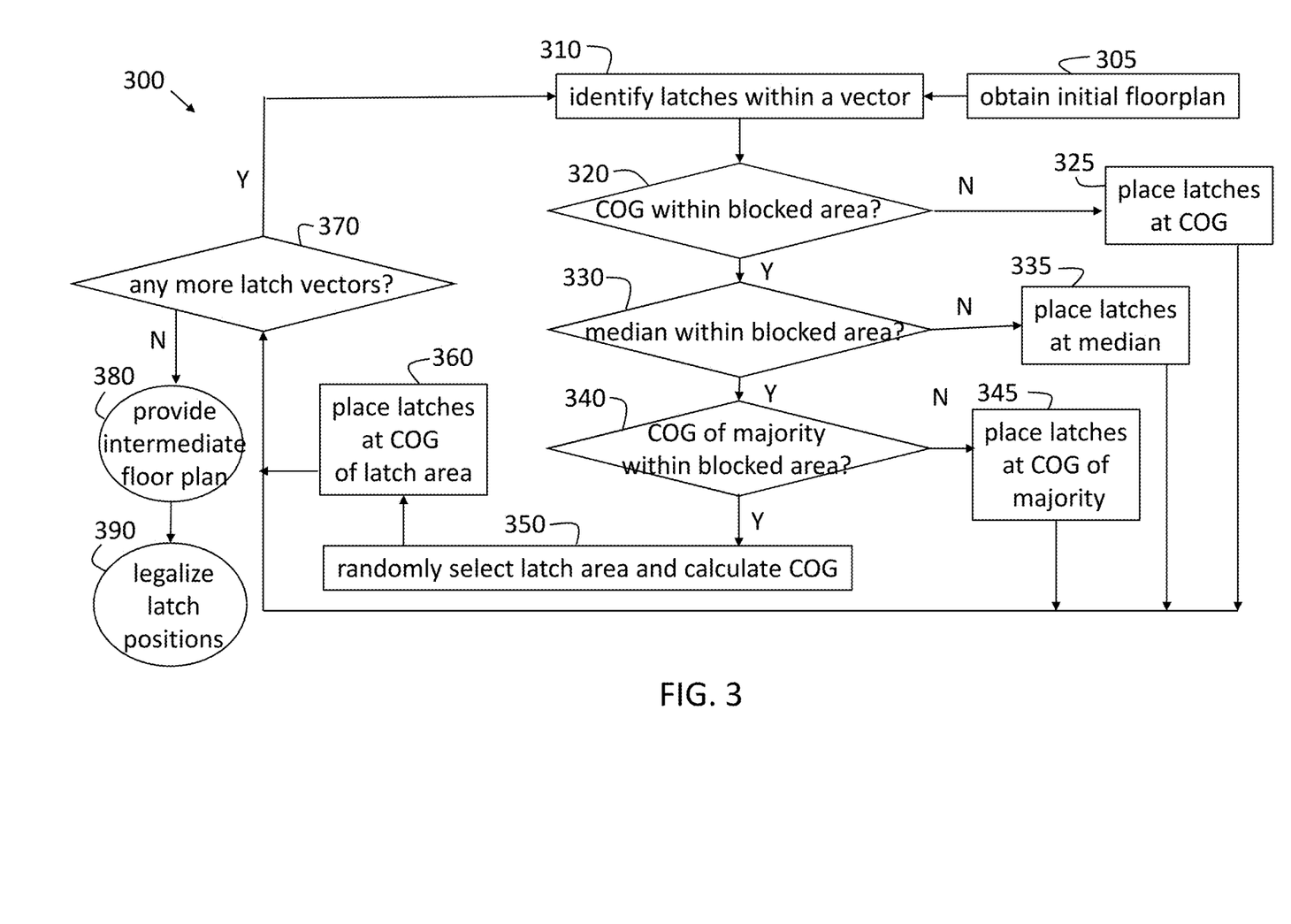
FIG. 3 is a process flow of a method of performing placement of vectorized latches in hierarchical integrated circuit development according to one or more embodiments of the invention.

FIG. 3, with continuing reference to FIG. 2, is a process flow of a method 300 of performing placement of vectorized latches 220 in hierarchical integrated circuit development according to one or more embodiments of the invention. At block 305, the process flow beings with obtaining an initial floorplan 200. At block 310, the method 300 includes identifying latches 220 within a vector 225. One vector 225 of latches 220 is identified for each iteration of processes 320 through 360. At block 320, a check is done of whether the COG 230 of the selected vector 225 of latches 220 is in a blocked area 201. If not, all the latches 220 of the vector 225 are placed at the location of the COG 230. If the check, at block 320, indicates that the COG 230 of the selected vector 225 of latches 220 is in the blocked area 201, then processing proceeds to block 330.

At block 330, a check is done of whether a median of the latches 220 of the selected vector 225 is in a blocked area 201. The median of the latches 220 refers to the middle value of a sorted list of the geometric points corresponding with the latches 220. If the median is not in a blocked area 201, all the latches 220 of the vector 225 are placed at the location of the median. If the check, at block 330, indicates that the median of the selected vector 225 of latches 220 is in the blocked area 201, then processing proceeds to block 340. At block 340, a check is done on the COG 230 of a subset of the latches 220 of the vector 225. Specifically, the largest subset of latches 220 (i.e., majority) placed within the same portioned area 205 or top-level area 215 is used and a COG 230 is obtained for that majority of latches 220. At block 340, a check is done of whether the COG 230 of the majority of latches 220 is in a blocked area 201. If the COG 230 of the majority is not in a blocked area 201, all the latches 220 of the vector 225 are placed at the location of the COG 230 of the majority of latches 220. If the check, at block 340, indicates that the COG 230 of the majority of latches 220 is in the blocked area 201, then processing proceeds to block 350.

At block 350, randomly selecting a latch area and calculating COG 230 refers to selecting a partitioned area 205 or a top-level area 215 where one or more latches 220 of the vector 225 are placed according to the initial floor plan 200. This partitioned area 205 or top-level area 215 is different from the partitioned area 205 or top-level area 215 where the most latches 220 (i.e., majority) of the vector 225 are placed. The COG 230 of the one or more latches 220 in the randomly selected partitioned area 205 or top-level area 215 is determined. At block 360, all the latches 220 of the vector 225 are placed at the COG 230 determined for latches 220 in the randomly selected partitioned area 205 or top-level area 215. At block 370, a check is done of whether any more vectors 225 of latches 220 remain unprocessed. If not, the processing is completed, and the intermediate floor plan 400 (FIG. 4) is provided, at block 380. If unprocessed vectors 225 remain, according to the check at block 370, then the next iteration is started, at block 310, by identifying latches 220 within another vector 225. Once the intermediate floor plan 400 is obtained at block 380, legalizing latch positions, at block 390, refers to modifying the positions of latches 220 of a vector 225 to ensure that they are not collocated. This is further discussed with reference to FIG. 5.

Figure 4:
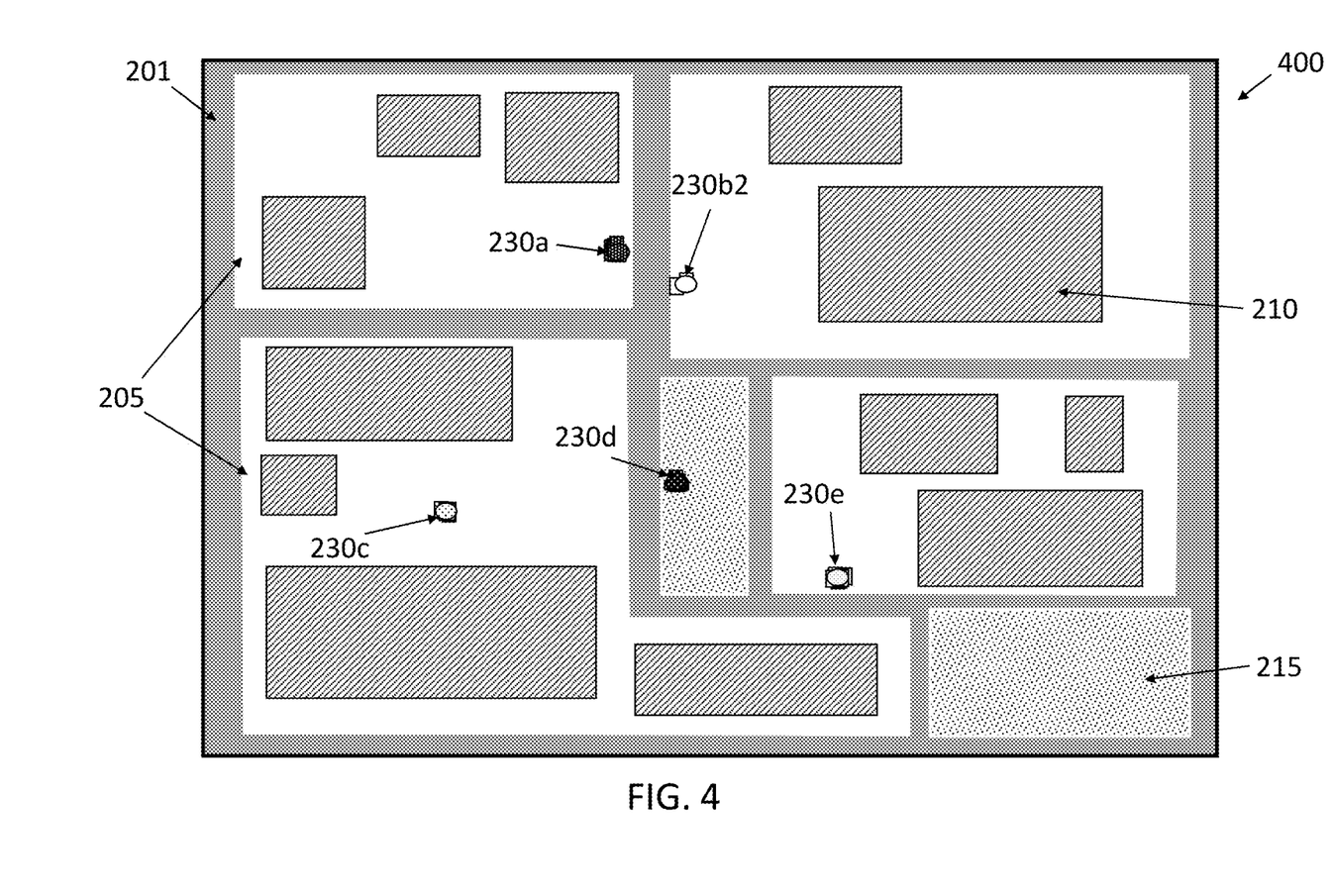
FIG. 4 is a block diagram of an exemplary intermediate floor plan resulting from the placement of vectorized latches in hierarchical integrated circuit development according to one or more embodiments of the invention.

FIG. 4, with continuing reference to FIGS. 2 and 3, is a block diagram of an exemplary intermediate floor plan 400 resulting from the placement of vectorized latches 220 in hierarchical integrated circuit development according to one or more embodiments of the invention. The exemplary intermediate floor plan 400 shown in FIG. 4 results from implementation of the method 300 shown in FIG. 3 on the exemplary initial floor plan 200 shown in FIG. 2. The partitioned areas 205, components 210, top-level areas 215, and blocked area 201 are all unchanged from the exemplary initial floor plan 200 shown in FIG. 2. The latches 220 of each vector 225 are co-located in the intermediate floor plan 400, as suggested by the method 300. In the initial floor plan 200, COG 230*a*, 230*c*, 230*d*, and 230*e* are all located in a partitioned area 205 or, in the case of COG 203*d*, in a top-level area 215. Thus, according to the check at block 320 and the process at block 325, the latches 220 associated with each of those COG 230*a*, 230*c*, 230*d*, and 230*e* are placed at the respective COG 230*a*, 230*c*, 230*d*, and 230*e*. In the initial floor plan 200, COG 230*b* is located in the blocked area 201. Assuming that block 340 was reached, the two latches 220 associated with COG 230*b* that are shown in the same partitioned area 205 are the majority for which COG 230*b*2 is found. According to block 345, all the latches 220 of the vector 225 associated with COG 230*b* in the initial floor plan 200 are located at the COG 230*b*2 of the majority in the intermediate floor plan 400.

Figure 5:
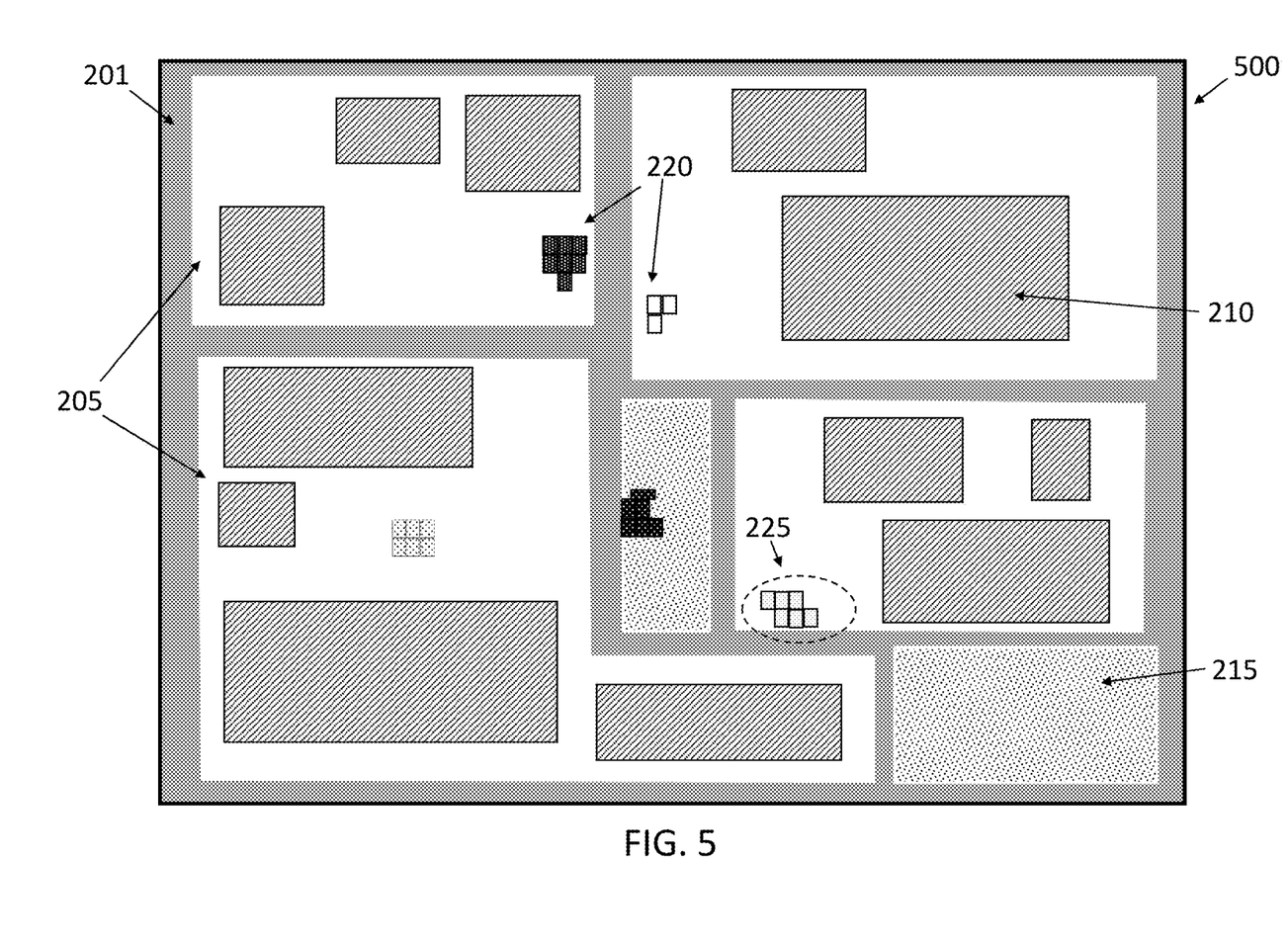
FIG. 5 is a block diagram of an exemplary result of legalizing latch positions according to one or more embodiments of the invention.

FIG. 5, with continuing reference to FIGS. 2-4, is a block diagram of an exemplary result of legalizing latch positions (at block 390) according to one or more embodiments of the invention. Specifically, the floor plan 500 shown in FIG. 5 is an exemplary result of legalizing the positions of the latches 220 shown in the intermediate floor plan 400. As FIG. 4 indicates, all the latches 220 of each vector 225 are collocated in the intermediate floor plan 400. In order to perform analysis (e.g., timing analysis, power analysis) to further refine the placement of components 210 and finalize the physical design to develop the integrated circuit 120, the latches 220 of each vector 225 must be separated. However, the latches 220 of each vector 225 must remain within the same partitioned area 205 or top-level area 215 in order to facilitate the refinement and optimization hierarchically. That is, the placement of components 210 within each partitioned area 205 can be optimized independently of the other partitioned areas 205 according to hierarchical design. Thus, the latches 220 of the same vector 205 must be kept in the same partitioned area 205 or top-level area 215 for proper final placement and optimization. The process of legalizing the positions of the latches 220 from the collocated positions shown in the intermediate floor plan 400 is known. However, using the intermediate floor plan 400 obtained according to the method 300 as a starting point for the process facilitates maintaining the latches 220 of a given 205 in the same partitioned area 205 or top-level area 215.

Figure 6:
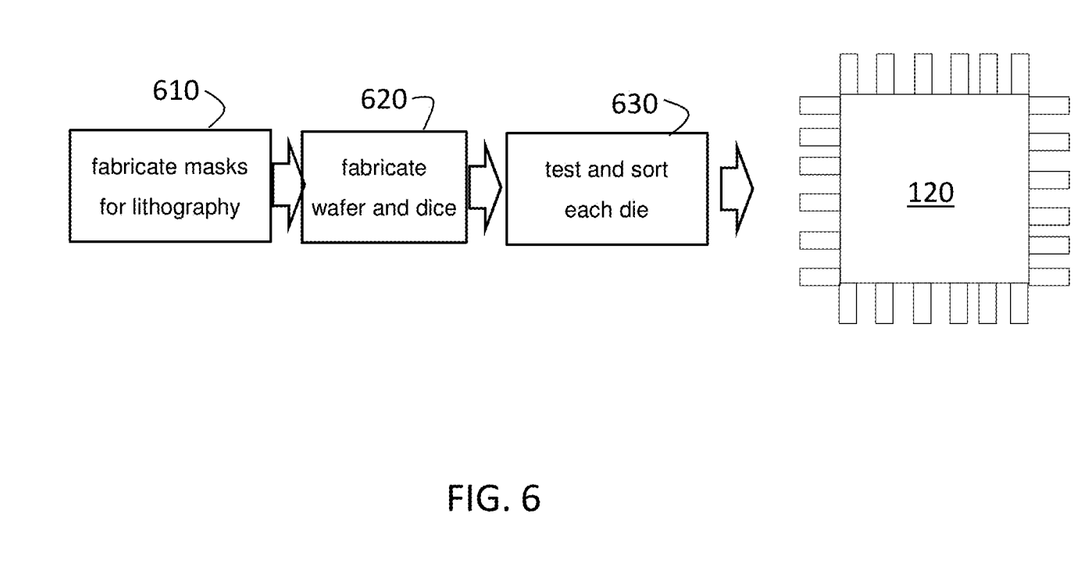
FIG. 6 is a process flow of a method of fabricating the integrated circuit according to exemplary embodiments of the invention.

FIG. 6 is a process flow of a method of fabricating the integrated circuit according to exemplary embodiments of the invention. Once the physical design data is obtained, based, in part, on the placement of vectorized latches 220 in hierarchical integrated circuit development according to one or more embodiments of the invention (e.g., the exemplary method 300), the integrated circuit 120 can be fabricated according to known processes that are generally described with reference to FIG. 6. Generally, a wafer with multiple copies of the final design is fabricated and cut (i.e., diced) such that each die is one copy of the integrated circuit 120. At block 610, the processes include fabricating masks for lithography based on the finalized physical layout. At block 620, fabricating the wafer includes using the masks to perform photolithography and etching. Once the wafer is diced, testing and sorting each die is performed, at block 630, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method to place latches during hierarchical integrated circuit development, the method comprising:
    obtaining, using a processor, an initial floor plan indicating a blocked region, two or more regions, and initial locations of components of the integrated circuit including the latches within one of the two or more regions, wherein the integrated circuit is organized into hierarchical levels such that each of the two or more regions is at one of the hierarchical levels;
    identifying, using the processor, a subset of the latches that belong to a vector as a vector of latches, wherein the subset of the latches in the vector of latches are single-bit latches that must be placed in a same one of the two or more regions;
    determining, using the processor, a center of gravity (COG) of the vector of latches, wherein the COG is a mean of geometric points corresponding with the subset of the latches that belong to the vector;
    placing, using the processor, all of the subset of the latches that belong to the vector at the COG of the vector of latches to generate an intermediate floor plan based on determining that the COG of the vector of latches is located in one of the two or more regions rather than in the blocked region;
    determining an alternate location in the intermediate floor plan for all of the subset of the latches that belong to the vector based on determining that the COG of the vector of latches is located in the blocked region, wherein the determining the alternate location includes determining a median of the vector of latches, and the median of the vector of latches is a middle value of a sorted list of the geometric points corresponding with the subset of the latches that belong to the vector, or the determining the alternate location includes identifying a region among the two or more regions that includes more of a number of the subset of the latches than any other region among the two or more regions and determining a COG of the number of the subset of the latches as a majority COG of the vector of latches, or the determining the alternate location includes identifying any region among the two or more regions that includes any number of the subset of the latches and determining a COG of the any number of the subset of the latches as a random COG of the vector of latches; and
    providing, by the processor, a final design of the integrated circuit that is obtained based on the intermediate floor plan for fabrication.

2. The computer-implemented method according to claim 1, further comprising, based on the determining the median of the vector of latches, placing all of the subset of the latches that belong to the vector at the median of the vector of latches to generate the intermediate floor plan based on determining that the median of the vector of latches is located in one of the two or more regions rather than in the blocked region.

3. The computer-implemented method according to claim 1, further comprising, based on the identifying the region among the two or more regions that includes more of the number of the subset of the latches than any other region among the two or more regions, placing all of the subset of the latches that belong to the vector at the majority COG of the vector of latches to generate the intermediate floor plan based on determining that the majority COG of the vector of latches is located in one of the two or more regions rather than in the blocked region.

4. The computer-implemented method according to claim 1, further comprising, based on the identifying any region among the two or more regions that includes any number of the subset of the latches placing all of the subset of the latches that belong to the vector at the random COG of the vector of latches to generate the intermediate floor plan based on determining that the random COG of the vector of latches is located in one of the two or more regions rather than in the blocked region.

5. The computer-implemented method according to claim 1, further comprising separating placements of the subset of the latches of the vector of latches within the one of the two or more regions prior to performing timing analysis and placement optimization for different ones of the hierarchical levels.

6. A system to place latches during hierarchical integrated circuit development, the system comprising:
   memory configured to store an initial floor plan indicating a blocked region, two or more regions, and initial locations of components of the integrated circuit including the latches within one of the two or more regions, wherein the integrated circuit is organized into hierarchical levels such that each of the two or more regions is at one of the hierarchical levels; and
   a processor configured to identify a subset of the latches that belong to a vector as a vector of latches, wherein the subset of the latches in the vector of latches are single-bit latches that must be placed in a same one of the two or more regions, to determine a center of gravity (COG) of the vector of latches, wherein the COG is a mean of geometric points corresponding with the subset of the latches that belong to the vector, and to place all of the subset of the latches that belong to the vector at the COG of the vector of latches to generate an intermediate floor plan based on determining that the COG of the vector of latches is located in one of the two or more regions rather than in the blocked region, wherein a final design of the integrated circuit that is obtained based on the intermediate floor plan is provided for fabrication, wherein
   the processor is configured to determine an alternate location in the intermediate floor plan for all of the subset of the latches that belong to the vector based on determining that the COG of the vector of latches is located in the blocked region, and
   the processor determines the alternate location by determining a median of the vector of latches, the median of the vector of latches being a middle value of a sorted list of the geometric points corresponding with the subset of the latches that belong to the vector, or the processor determines the alternate location by identifying a region among the two or more regions that includes more of a number of the subset of the latches than any other region among the two or more regions and determining a COG of the number of the subset of the latches as a majority COG of the vector of latches, or the processor determines the alternate location by identifying any region among the two or more regions that includes any number of the subset of the latches and determining a COG of the any number of the subset of the latches as a random COG of the vector of latches.

7. The computer-implemented method according to claim 6, wherein, based on the processor determining the median of the vector of latches, the processor places all of the subset of the latches that belong to the vector at the median of the vector of latches to generate the intermediate floor plan based on determining that the median of the vector of latches is located in one of the two or more regions rather than in the blocked region.

8. The computer-implemented method according to claim 6, wherein, based on the processor identifying the region among the two or more regions that includes more of the number of the subset of the latches than any other region among the two or more regions, the processor places all of the subset of the latches that belong to the vector at the majority COG of the vector of latches to generate the intermediate floor plan based on determining that the majority COG of the vector of latches is located in one of the two or more regions rather than in the blocked region.

9. The computer-implemented method according to claim 6, wherein, based on the processor identifying any region among the two or more regions that includes any number of the subset of the latches, the processor places all of the subset of the latches that belong to the vector at the random COG of the vector of latches to generate the intermediate floor plan based on determining that the random COG of the vector of latches is located in one of the two or more regions rather than in the blocked region.

10. The computer-implemented method according to claim 6, wherein the processor is further configured to separate placements of the subset of the latches of the vector of latches within the one of the two or more regions prior to performing timing analysis and placement optimization for different ones of the hierarchical levels.

11. A computer program product for placing latches during hierarchical integrated circuit development, the computer program product comprising a computer readable storage medium having program instructions embodied therewith, the program instructions executable by a processor to perform a method comprising:
   obtaining an initial floor plan indicating a blocked region, two or more regions, and initial locations of components of the integrated circuit including the latches within one of the two or more regions, wherein the integrated circuit is organized into hierarchical levels such that each of the two or more regions is at one of the hierarchical levels;
   identifying a subset of the latches that belong to a vector as a vector of latches, wherein the subset of the latches in the vector of latches are single-bit latches that must be placed in a same one of the two or more regions;
   determining a center of gravity (COG) of the vector of latches, wherein the COG is a mean of geometric points corresponding with the subset of the latches that belong to the vector;
   placing all of the subset of the latches that belong to the vector at the COG of the vector of latches to generate an intermediate floor plan based on determining that the COG of the vector of latches is located in one of the two or more regions rather than in the blocked region;
   determining an alternate location in the intermediate floor plan for all of the subset of the latches that belong to the vector based on determining that the COG of the vector of latches is located in the blocked region, wherein the determining the alternate location includes determining a median of the vector of latches, and the median of the vector of latches is a middle value of a sorted list of the geometric points corresponding with the subset of the latches that belong to the vector, or the determining the alternate location includes identifying a region among the two or more regions that includes more of a number of the subset of the latches than any other region among the two or more regions and determining a COG of the number of the subset of the latches as a majority COG of the vector of latches; and providing a final design of the integrated circuit that is obtained based on the intermediate floor plan for fabrication.

12. The computer program product according to claim 11, further comprising, based on determining the median of the vector of latches, placing all of the subset of the latches that belong to the vector at the median of the vector of latches to generate the intermediate floor plan based on determining that the median of the vector of latches is located in one of the two or more regions rather than in the blocked region.

13. The computer program product according to claim 11, further comprising, based on identifying the region among the two or more regions that includes more of a number of the subset of the latches than any other region among the two or more regions, placing all of the subset of the latches that belong to the vector at the majority COG of the vector of latches to generate the intermediate floor plan based on determining that the majority COG of the vector of latches is located in one of the two or more regions rather than in the blocked region.

14. The computer program product according to claim 11, further comprising separating placements of the subset of the latches of the vector of latches within the one of the two or more regions prior to performing timing analysis and placement optimization for different ones of the hierarchical levels.

* * * * *